United States Patent [19]

Baumann

[11] 4,219,521
[45] Aug. 26, 1980

[54] METHOD OF EXTRUDED CATALYST MANUFACTURE

[75] Inventor: William M. Baumann, Downers Grove, Ill.

[73] Assignee: UOP Inc., Des Plaines, Ill.

[21] Appl. No.: 965,455

[22] Filed: Nov. 30, 1978

[51] Int. Cl.² ............................................. B01J 2/12
[52] U.S. Cl. .................................. 264/141; 252/461; 264/234; 425/308
[58] Field of Search ............... 264/141, 143, 234, 144, 264/118, 8; 425/289, 308; 252/461

[56] References Cited

U.S. PATENT DOCUMENTS

| | | | |
|---|---|---|---|
| 2,460,811 | 2/1949 | Davies et al. | 264/141 |
| 2,630,617 | 3/1953 | Robinson | 264/141 |
| 2,755,509 | 7/1956 | Smidth | 264/118 |
| 2,924,847 | 2/1960 | Keiding et al. | 264/8 |

Primary Examiner—Jeffery R. Thurlow
Attorney, Agent, or Firm—James R. Hoatson, Jr.; John F. Spears, Jr.; William H. Page, II

[57] ABSTRACT

A method of manufacturing an extruded catalyst base or an extruded catalyst. The extrudate is dropped into the first end of a revolving drum having blades attached to its inner surface. The extrudate resting on the blades is lifted and then dropped upon a revolving impacting means which is rotated in the opposite direction than the drum. This produces extrudate particles of a suitable length for the following catalyst manufacturing steps.

8 Claims, 2 Drawing Figures

METHOD OF EXTRUDED CATALYST MANUFACTURE

FIELD OF THE INVENTION

The invention relates to a method of manufacturing solid catalyst which may be used in a wide variety of chemical and hydrocarbon conversion processes. The invention also relates to a method of manufacturing an extruded catalyst base or extruded catalyst. The invention more specifically relates to a method of breaking strands comprising extruded catalyst base material into particles of the desired length of the end-product catalyst.

DESCRIPTION OF THE PRIOR ART

Extruded catalysts have been manufactured for a long time and are in widespread commercial use. As a part of the overall catalyst production process, the raw extrudate strands are broken into smaller lengths. The most relevant method of effecting this size reduction is believed to be the use of a revolving sizing drum similar to that utilized in the subject invention. In this prior art method, the catalyst is fed to the first end of a revolving sizing drum. Quantities of the extrudate are caught upon blades mounted on the internal surface of the drum and lifted by the blades until, by the action of gravity, the extrudate falls from the blades at an upper point in the internal volume of the sizing drum. The extrudate then falls to a lower point in the sizing drum where it is again impacted by a blade attached to the surface of the drum. In this manner, the raw extrudate strands are tossed and turned over several times before exiting the second end of the sizing drum and a substantial reduction in the length of the extrudate is effected.

BRIEF SUMMARY OF THE INVENTION

The invention provides a method of manufacturing an extruded catalyst base which is capable of producing shorter extrudate particles and extrudate particles of more uniform length than the just-described prior art method. The invention may be broadly characterized as a method of manufacturing an extruded catalyst base which comprises the steps of extruding an extrudable semi-solid material to form strands of extrudate; dropping these strands of extrudate into the first end of a substantially horizontal sizing drum which is revolving in a first direction and which has extrudate-holding means mounted on the sizing drum's internal cylindrical surface; lifting at least the majority of the extrudate above the midpoint of the internal volume of the sizing drum in said holding means and then dropping this extrudate onto a revolving impacting means which is located within the sizing drum and is turning in the opposite direction than the sizing drum; and removing pieces of extrudate having a desired average length from the second end of the sizing drum.

DESCRIPTION OF THE DRAWING

Referring now to FIG. 1, the cylindrical outer shell 1 of the sizing drum rests upon two wheels 4 which contact the lower outside surface of the sizing drum. These wheels are attached to a base 2 by the support members 3. A motor 5 drives one of the wheels 4 which in turn causes the entire sizing drum to rotate in a counter-clockwise direction. Four sets of flat blades 6 are mounted on the inner surface of the sizing drum. These blades may be set at various angles which tend to push the extrudate toward the closer end of the sizing drum. The extrudate strands are passed into the end of the sizing drum which is furthest away in this view and fall upon the inner surface of the sizing drum. Bunches of the extrudate are caught upon the blades 6 and thereby lifted to the point at which they fall from the blades by the action of gravity. The sizing drum is rotated at a velocity such that the falling extrudate lands upon the revolving paddles 8 of an impacting means or "whip" which rotates about a shaft 7. A discoid ring 9 is attached to the inlet or far end of the sizing drum to prevent extrudate particles from falling from this end of the drum.

FIG. 2 provides a better view of the preferred structure of the blades 6 which are mounted to the inner surface of the sizing drum 1. The three sets of perforated paddles 8 which are mounted on the revolving shaft 7 are located at points along the shaft which coincide with the location of the blades 6 on the sizing drum's inner surface. The discoid ring 9 is attached only to the inlet or first end of the sizing drum.

DETAILED DESCRIPTION

Figure 2:
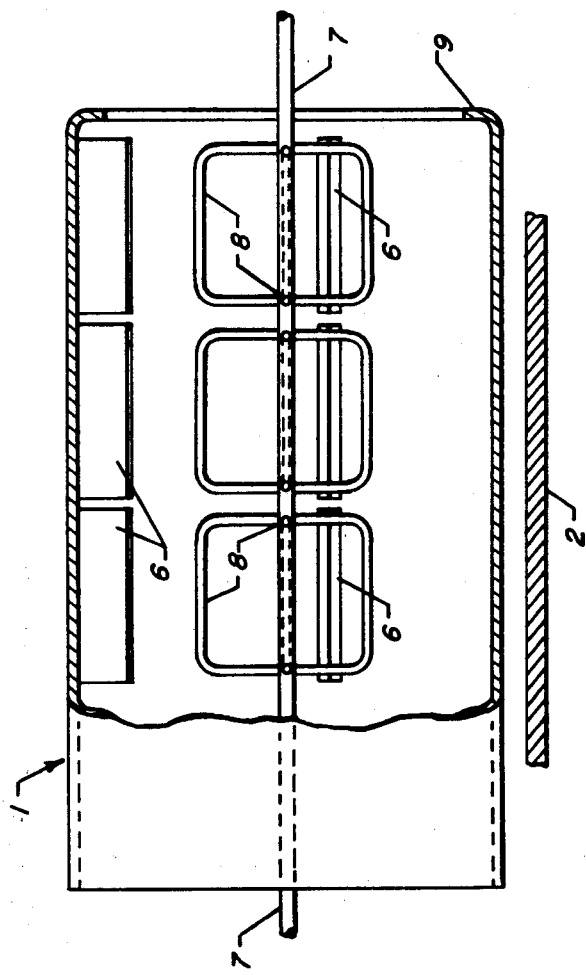
FIG. 2 is a cross-sectional view taken along a vertical plane extending through the internal volume of the sizing of FIG. 1.
Figure 1:
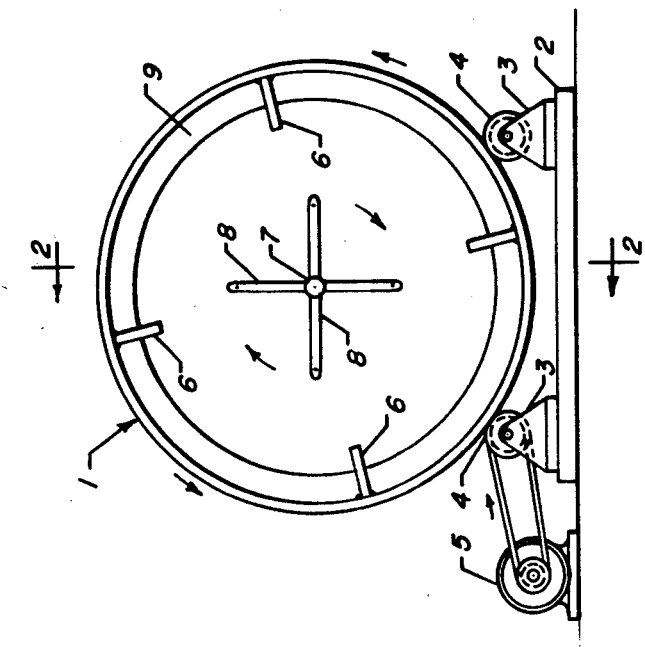
FIG. 1 is a simplified presentation of the view as seen looking inward through the open second end of the sizing drum.

A large number of catalytic hydrocarbon conversion and chemical processes utilize a catalyst which has been formed by extrusion or which is manufactured from an extruded base material. These processes include the typical hydrocarbon conversion processes such as hydrodesulfurization, hydrocracking, reforming, transalkylation, alkylation, isomerization, hydrogenation, dehydrogenation and hydrodealkylation. Extruded catalysts or catalyst bases may also be employed in processes for the removal of contaminants from gas streams such as the removal of sulfur oxides from a flue gas stream or the catalytic reduction of nitrogen oxides which are contained in a flue gas stream. The newly extruded catalysts or supports emerge from the extruder in the form of lengthy strands of a semi-rigid wet material which may contain up to about 50 wt.% water. These extrudate strands must be broken down into particles of the proper length before they may be further processed.

It is an objective of the subject of the invention to provide a method of manufacturing a solid extruded catalyst. It is another objective of the subject invention to provide a method of breaking extruded catalyst base material into suitably sized particles. It is a further objective of the subject invention to provide a method of manufacturing an extruded catalyst base.

The subject method may be applied to the manufacture of both catalysts and catalyst bases. The extrudate which is processed in the subject invention may therefore contain a catalytic component or it may be devoid of any catalytic component which is not indigenous to the extruded material. The extrudate strands which are fed into the first end of the sizing drum will normally comprise an inorganic oxide catalyst base material such as alumina, boria, silica, faujasite, and various aluminosilicates including the many zeolites. The catalyst component which may be present in the extrudate is typically one or more metals or metal compounds such as oxides or sulfates. The metals are often chosen from Groups VI and VIII of the Periodic Table, with representative metals including nickel, cobalt, tungsten, iron, copper, palladium, platinum, rhenium, tin, and iron. Alkali or alkaline earth metals may also be present in the extrudate. The extrudate may also contain one or more of the halogens.

The extrudate is formed by extruding a semi-solid extrudable mixture comprising the inorganic oxide catalyst base. Preferably, the freshly extruded strands fall upon a conveyor which transports the extrudate strands to the inlet end of the slightly inclined sizing drum. The sizing drum functions to break the still pliable extrudate into particles having a suitable length for the intended use of the end-product extrudate. The extrudate passes through the sizing drum and then is preferably deposited on a second conveyor which transports the extrudate particles to downstream operations such as calcining, screening, halogenation or metals impregnation.

The sizing drum is operatively connected to a drive means which rotates it about its longitudinal central axis. This driving means is preferably an electric motor which drives the drum by means of a belt which may be connected to the drum itself or to some rotating supporting means as shown in the Drawing. The drum may also be rotated by means of a direct gear drive between the motor and the drum. The drum is rotated at a speed of from about 5 to about 100 rpm. The rate of rotation of the drum should be sufficient to result in the extrudate being tossed in a forward direction when it falls from the holding means attached to the inner surface of the drum. That is, the rate of rotation of the drum should be great enough that the extrudate does not fall directly downward upon leaving the holding means but continues at an angle due to its horizontal momentum.

The sizing drum preferably has an internal diameter in excess of 0.5 meters but less than 2.0 meters. The sizing drum preferably has a length, as measured from the inlet end to the outlet end, in excess of 1 meter and preferably in the general range of from about 1.5 to 5.0 meters. The sizing drum should be tipped at a very slight angle, with the outlet end of the drum being lower than the inlet end. The angle of incline of the sizing drum is preferably less than about 15° but greater than about 1° as compared to true horizontal. An angle of about 2° is preferred.

The holding means located on the inner surface of the sizing drum is preferably constructed in a manner similar to those shown in the Drawing. That is, three sets of four blades are equally spaced around the diameter of the drum. Preferably, the blades closest to the outlet end of the drum are tilted at an angle which results in the extrudate particles being pushed toward the outlet end of the drum by the blades. A larger number of blades or sets of blades than shown in the Drawing may be used. A wide variety of other holding means may also be used, including scoops or cups or continuous slats and other pieces of similar apparatus capable of retaining the extrudate on the inclined inner surface of the drum. A number of aligned finger-like projections similar to those found on a garden rake may also be employed as the extrudate holding means. The holding means may be perforated rather than solid.

The holding means should be of sufficient size and of a character which results in substantial quantities of the extrudate remaining in or on the holding means until it is lifted at least above the vertical mid-point of the drum. That is, at least a majority of the extrudate which is to be broken should be lifted by the holding means above the horizontal central axis running along the length of the drum. Preferably, the extrudate is lifted to a point approaching the top of the cylindrical internal volume of the drum. The rate of rotation of the sizing drum may be adjusted as needed to achieve the desired extrudate travel.

The extrudate falls from the holding means onto a revolving impacting means. The impacting means preferably comprises a plurality of perforated paddles which are mounted at various angles along the central shaft which is concentric with the sizing drum. This impacting means is rotated at a faster rate than the drum with a broad range of rotational velocities being from about 15 to about 2000 rpm. The impacting means preferably extends along the length of the drum for the same distance as the extrudate holding means. The impacting means preferably is formed by groupings of four U-shaped bars mounted at right angles to each other and having an overall appearance resembling that of a common domestic egg beater. Adjacent sets of these blades may be mounted on the shaft at different angles. The Drawing presents the preferred configuration of the impacting means. However, it is preferred that this basic structure is reinforced by cross-bars and discoid rings extending between the paddles of the impacting means.

In performing the subject method, the extrudate is lifted from the bottom of the drum and is then tossed upon the revolving impacting means. The impacting means slams into the descending extrudate particles resulting in the breakage of a sizable number of the extrudate particles. The impacting means also tosses pieces of the extrudate against the inner surface of the sizing drum and against the holding means to thereby effect additional breakage of the extrudate. The use of impacting means having large open areas or perforations is preferred as this allows the smaller pieces of extrudate to pass through with less breakage.

The extrudate may also be at least partially dried while in the sizing drum. The surface drying of the extrudate appears to help the strands break into smaller length pieces. The drying may be performed in several different ways. For instance, heat may be applied to the sizing drum through electric heaters located on the outside of the drum. The extrudate would then be warmed and dried by contact with the warm inner surface of the sizing drum. As an alternate, infrared heat lamps may be pointed into the internal volume of the drum. A stream of heated air may be passed through the drum as another means of drying the extrudate.

I claim as my invention:

1. In a method for the manufacture of solid catalyst wherein a semi-solid extrudable material comprising an inorganic oxide catalyst base is extruded and the resultant strands of extrudate are passed through an inclined revolving sizing drum wherein the strands of extrudate are broken into extrudate particles, the improvement which comprises lifting at least a majority of the extrudate above the mid-point of the internal volumn of the revolving sizing drum on holding means mounted on the inner surface of said drum, and then breaking thus elevated extrudate into particles of smaller size by dropping the same onto a revolving impacting means located within the sizing drum and which is revolving in the opposite direction than the sizing drum.

2. The improvement of claim 1 further characterized in that the impacting means is rotated at a faster rate than the sizing drum.

3. The improvement of claim 2 further characterized in that the impacting means is concentric with the sizing drum.

4. A method of manufacturing an extruded catalyst which comprises the steps of:
   (a) extruding a semi-solid material comprising an inorganic oxide catalyst base and thereby forming stands of extrudate;
   (b) introducing said strands of extrudate into one end of an inclined sizing drum which is revolving in a first direction and which has extrudate holding means mounted on its internal surface;
   (c) lifting at least a majority of the extrudate fed to the sizing drum above the midpoint of the sizing drum in said extrudate holding means, and breaking the thus elevated extrudate into particles of smaller size by dropping the same onto a revolving impacting means located within the sizing drum and which is revolving in the opposite direction than the sizing drum; and,
   (d) removing pieces of extrudate from the other end of the sizing drum.

5. The method of claim 4 further characterized in that the impacting means is rotated at a faster speed than the sizing drum.

6. The method of claim 5 further characterized in that the impacting means is concentric with the internal cylindrical surface of the sizing drum.

7. The method of claim 6 further characterized in that the impacting means comprises a plurality of perforated paddles mounted along the length of a central shaft, with at least two paddles projecting outward from the shaft along different radii at the same point along the shaft.

8. The method of claim 5 further characterized in that the extrudate is partially dried within the sizing drum.

* * * * *